PHASE COMPARISON CIRCUIT

Filed Oct. 26, 1964 Sheet 1 of 5

INVENTOR
STEPHEN E. TOWNSEND
BY Joseph J. Rosenthal
AGENT
Anthony D. Cennamo
ATTORNEY INVENTOR.
STEPHEN E. TOWNSEND
BY Joseph J. Rosenthal
AGENT
Anthony D. Cennamo
ATTORNEY INVENTOR.
STEPHEN E. TOWNSEND
BY Joseph J. Rosenthal
AGENT
Anthony R. Cennamo
ATTORNEY INVENTOR.
STEPHEN E. TOWNSEND
BY Joseph J. Rosenthal
AGENT
Anthony D. Cennamo
ATTORNEY INVENTOR
STEPHEN E. TOWNSEND
BY Joseph F. Rosenthal
AGENT
Anthony D. Cennamo
ATTORNEY United States Patent Office 3,437,845
Patented Apr. 8, 1969

3,437,845
PHASE COMPARISON CIRCUIT
Stephen E. Townsend, Rochester, N.Y., assignor to Xerox Corporation, Rochester, N.Y., a corporation of New York
Filed Oct. 26, 1964, Ser. No. 406,454
Int. Cl. H03k 1/16
U.S. Cl. 307—295 7 Claims

ABSTRACT OF THE DISCLOSURE

A facsimile sychronization system wherein sychronization (sync) and video signals are combined at a facsimile transmitter and sent to a facsimile receiver where the combined signal is gated and the sync and video signals are separated, wherein the separated sync signal is compared to a local clock signal produced by the receiver with the phase relation between the signals giving rise to an error signal used to vary the frequency of the local clock in order to obtain synchronization between the sync and clock signals, wherein the combined sync and video signal is gated to a sync separator circuit initially during the entire period of the combined signal, and after synchronization is established, only during the synchronization portion of the combined signal, the gating of the combined signal enabling the sytem to readily distinguish between the synchronization and video information, and wherein the comparison between the sync and local clock signals is made by a comparator circuit employing a ramp generator and switching means which produce a signal having an amplitude proportional to the phase angle between the two signals, with this signal being stored in a capacitor and applied from the capacitor to the receiver clock generator where its amplitude causes a change in the clock frequency required to effect synchronization.

This invention relates to synchronizing means and more particularly to synchronizing circuits for facsimile systems and similar time-keyed information transmitting systems.

In many communication systems, information is transmitted which is valueless except as it is related to some time value or time scale which is common to both transmitter and receiver. A common example is television, where the received picture is completely unintelligible unless the receiver scanning is locked in phase and frequency with the transmitter scanning. Similar problems exist in time division multiplexing telemetering systems, facsimile systems, and the like. In such systems information is transmitted in a repetitive series of uniform short intervals. Most of each interval is given over to the transmission of pictures or other data, but part of the interval is given over to the transmission of a synchronizing signal of predetermined form. A common problem is to reliably detect the frequency and phase of the synchronizing signal in the presence of noise, distortion, dropout or of information signals which resemble the synchronizing signals. The novel solution described herein will be described in terms of a facsimile transmission system, but its utility extends to all systems having similar synchronizing problems.

Figure 1:
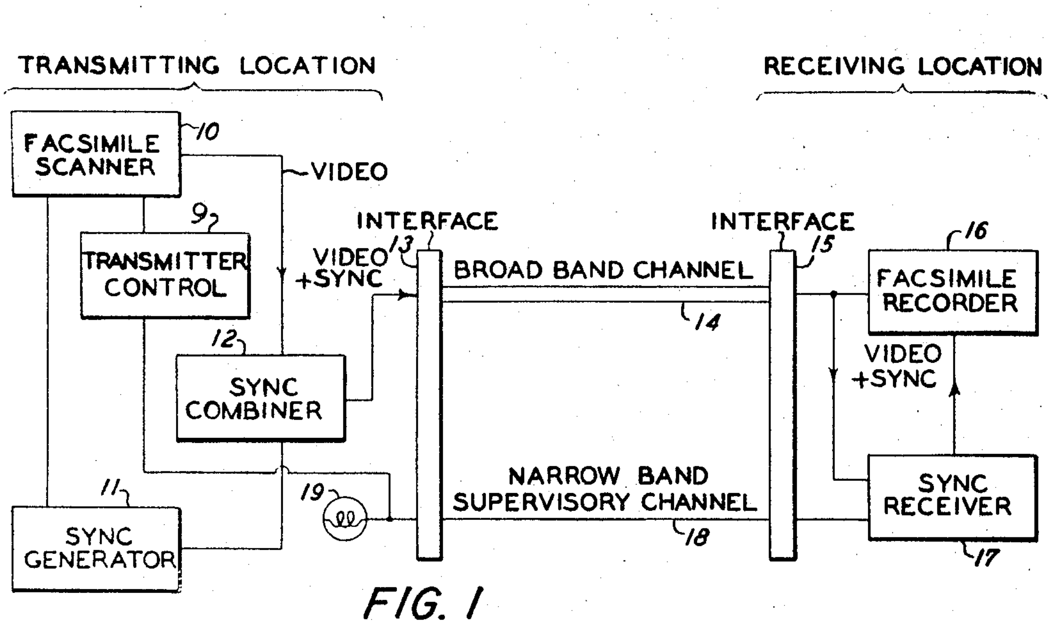
Figure 2:
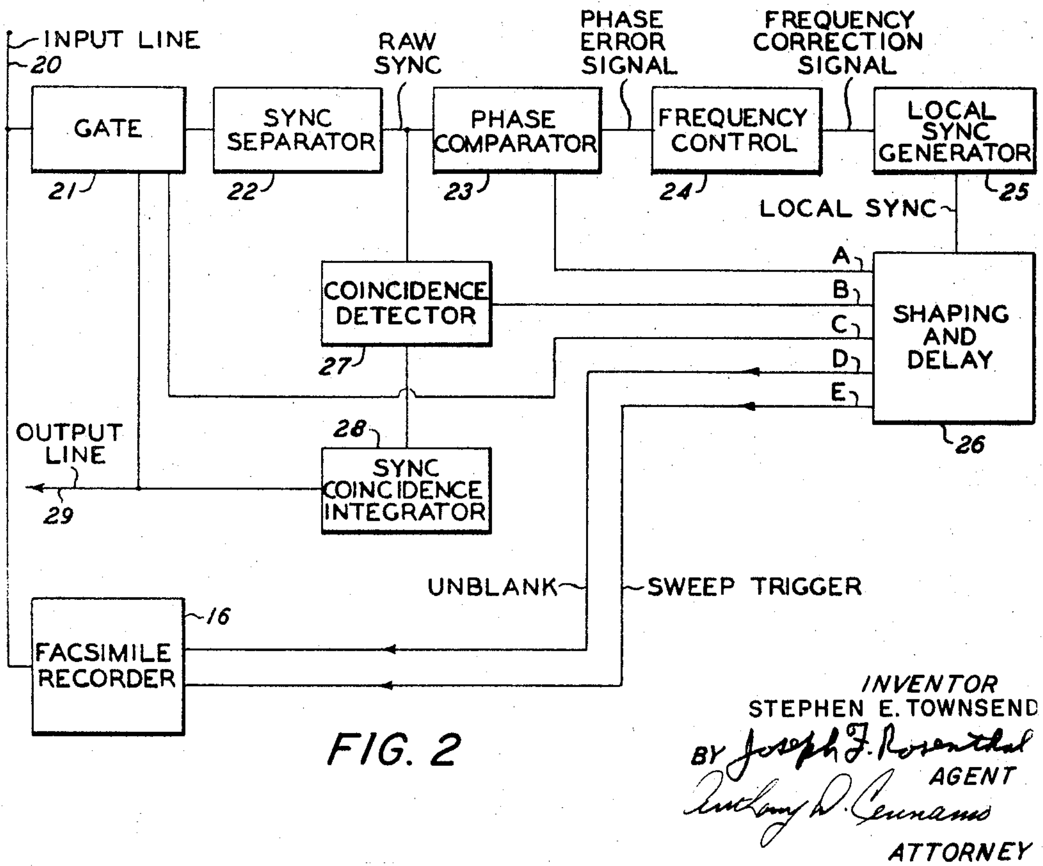
Figure 3A:
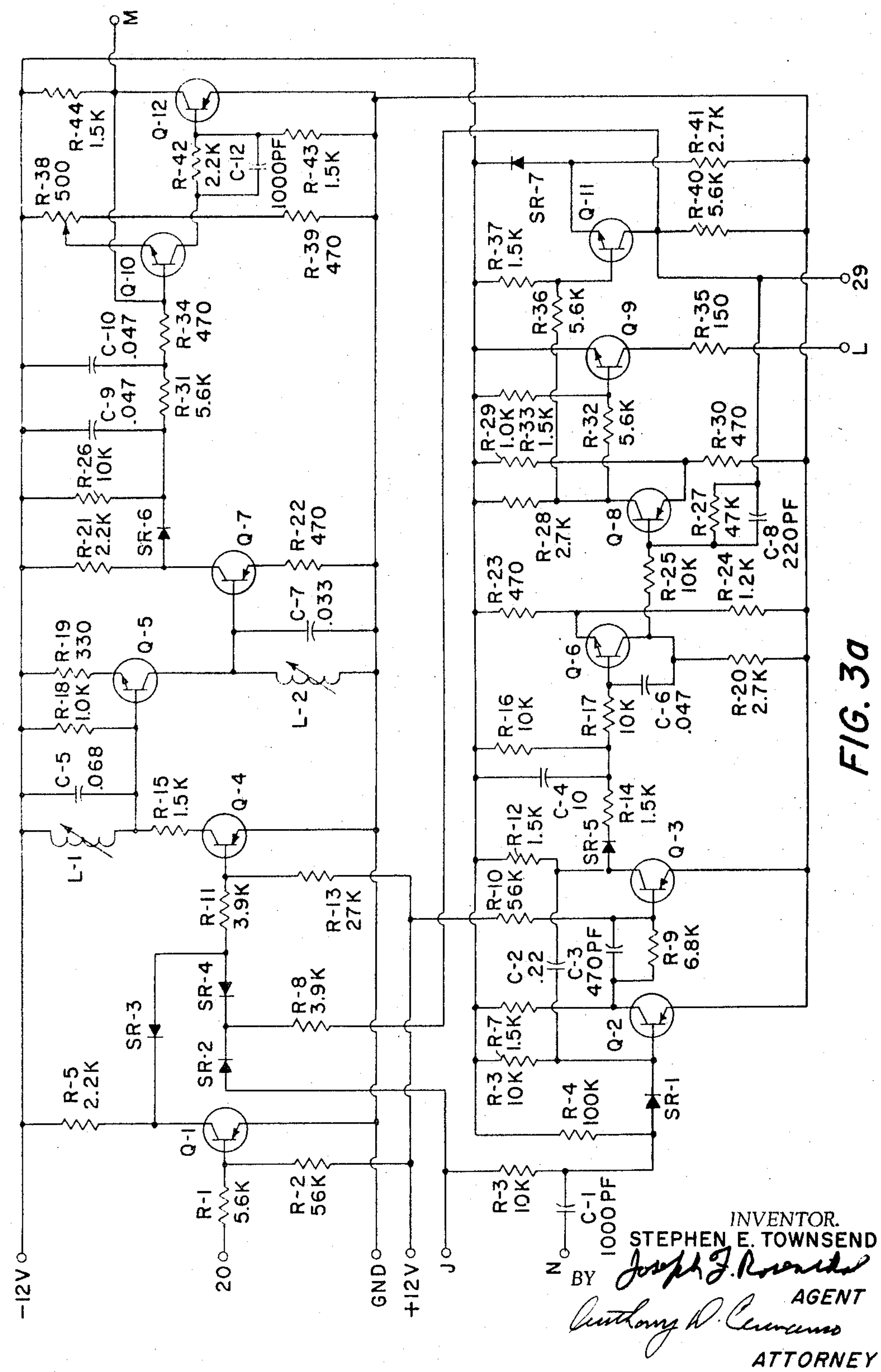
Figure 3B:
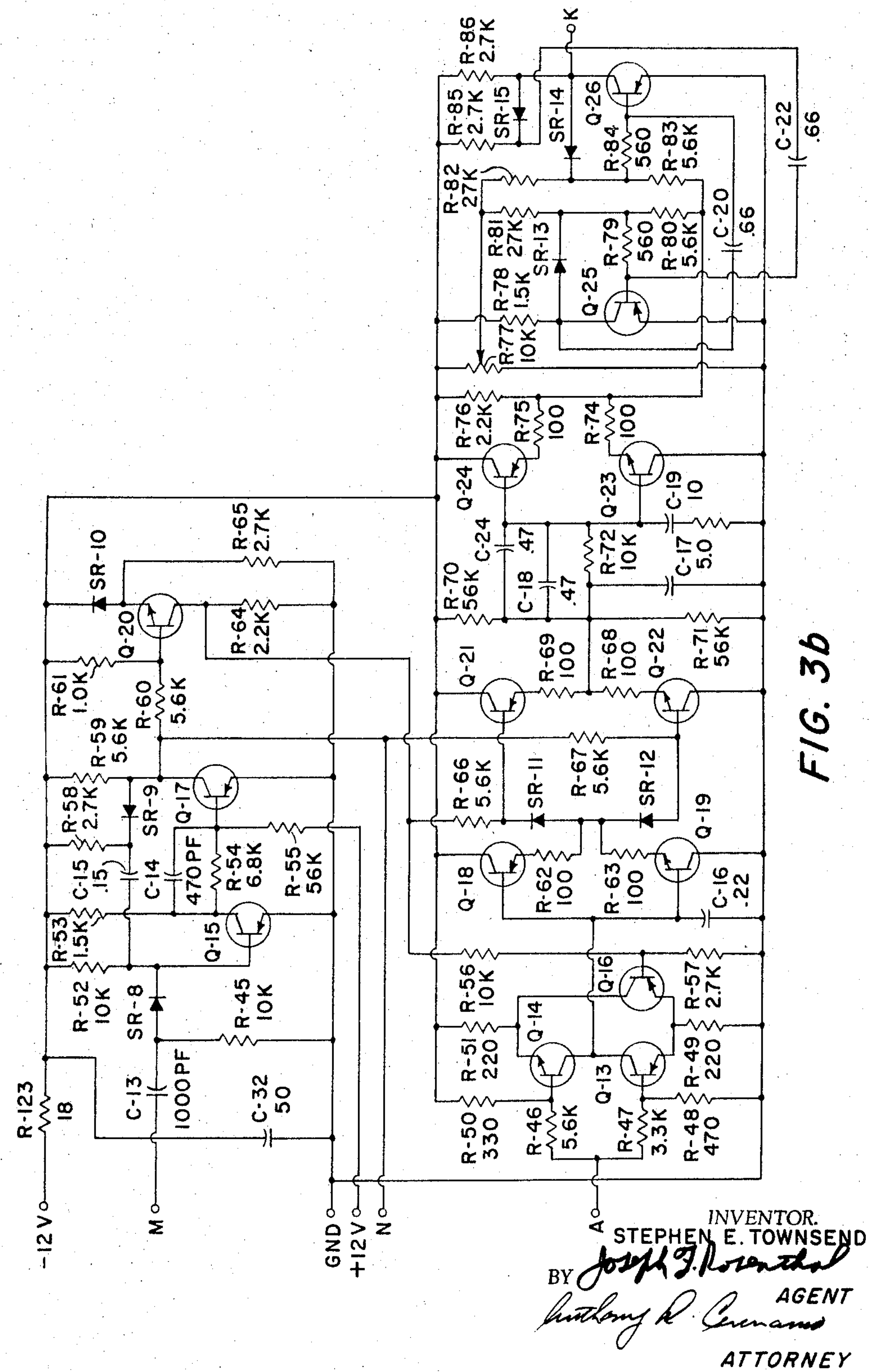
Figure 3C:
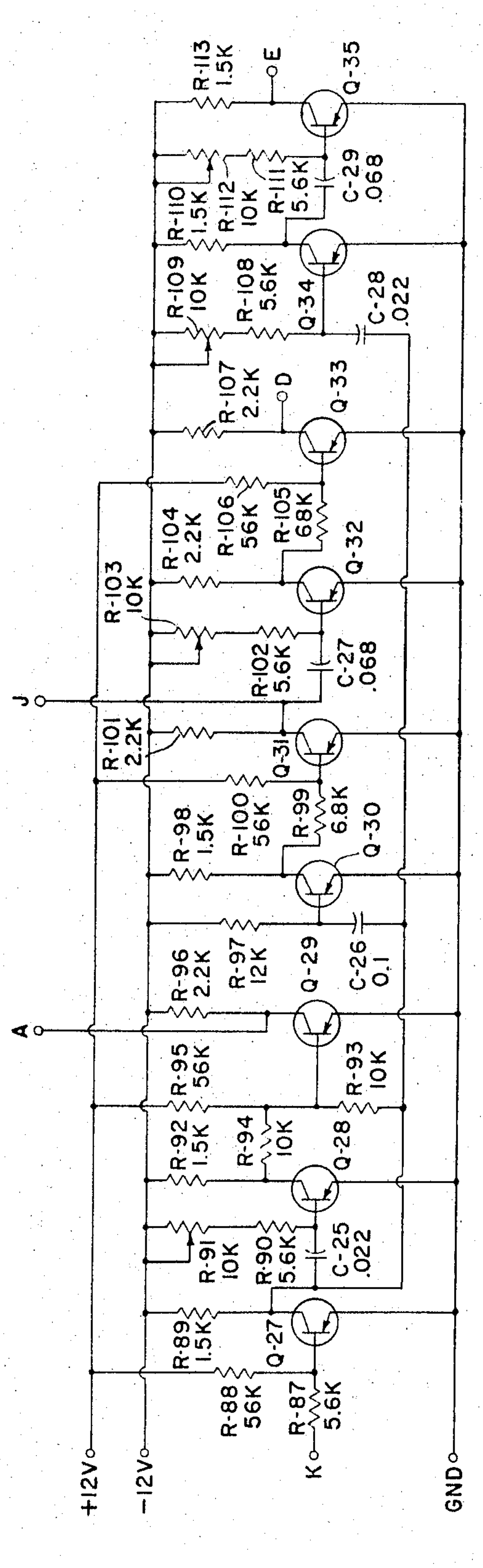
Figure 4:
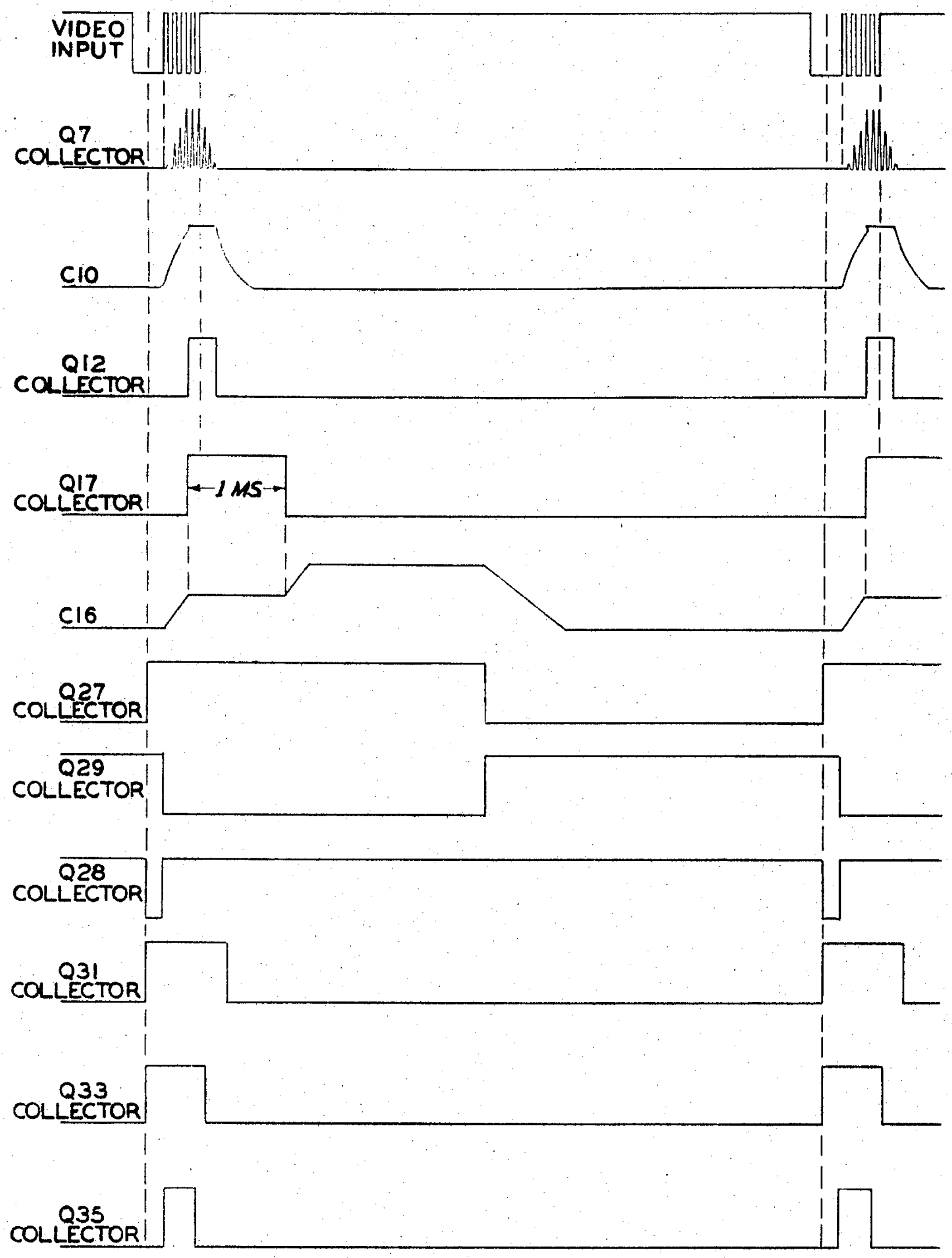

In the figures, FIGURE 1 is a schematic rperesentation of a facsimile system according to the invention;

FIG. 2 is a block diagram of synchronizing apparatus according to the invention; and FIG. 3, including FIGS. 3*a*–3*c*, is a circuit diagram of a specific preferred embodiment; and FIG. 4 is a set of waveforms illustrating the operation of the circuit of FIG. 3.

FIGURE 1 includes a facsimile scanner 10 which may be of any conventional type such as a rotating drum scanner or a flying spot scanner. A sync generator 11 is connected to scanner 10 and controls the scanning operation so that it is carried out at a fixed predetermined rate. Thus, the sync generator may control the speed of a rotating drum scanner or control the deflection circuits of a flying spot scanner. Scanner 10 produces a video output signal which is representative of brightness values of a picture or document being scanned. Both scanner 10 and sync generator 11 are connected to a sync combiner 12 which adds periodic synchronizing signals of suitable form to the video signal. These signals are generally inserted between scan periods. The combined video and sync signal from combiner 12 is applied to interface unit 13 which couples the signals to transmission channel 14. Interface 13 may be no more than a junction box but usually includes encoders, modulators, etc., depending upon the nature of the transmission channel. The transmission channel 14 may be a twisted pair of wires, an open wire line, a coaxial cable, a microwave transmitter and receiver, or the like. Most commonly, it will be a leased channel from a common carrier communication company. Interface 15 is at the receiving location which may be thousands of miles away. It demodulates the signal and provides a combined video and sync signal corresponding to that applied to interface 13, except for noise, distortion, and frequency discrimination inevitably added in the transmission channel. The video and sync output from interface 15 is connected to a facsimile recorder 16 and a sync receiver 17. Sync receiver 17 supplies to recorder 16 a synchronizing signal which ideally will cause the recorder to operate in exact synchronism with scanner 10. Recorder 16 will then record the video signal as an accurate duplicate of the document scanner in scanner 10. This may be accomplished by conventional means such as imaging a cathode ray beam which is synchronized by sync receiver 17 and intensity modulated by the incoming video signal onto a slowly moving photosensitive medium which is then developed.

It is often desirable to have available at the transmitting location signals indicative of the conditions at the receiving location. In particular, it is desirable to have available an indication of whether the recorder is in fact locked into synchronism with the scanner. Such a signal may be generated by sync receiver 17 and transmitted back to interface 13 through a supervisory channel 18 which may also carry other information of a supervisory character. Channel 18 may also be multiplexed with a broad band channel carrying facsimile or other signals from interface 15 to interface 13. A signal indicating achieved synchronism may be indicated at the transmitting location by a lamp 19, as indicated, or the signal may be connected to transmitter control unit 9 and used to prevent transmission of actual information bearing signals as by interrupting scanning or document feed until synchronism has been achieved and to interrupt such transmission if synchronism is lost for any reason.

This invention is concerned with means and methods for performing the functions described in connection with sync receiver 17. It is accordingly an object of the invention to provide a method of recovering synchronizing signals from composite signals containing information and synchronizing signals.

It is a further object of the invention to provide means for generating synchronizing signals which are phase locked to synchronizing signals in a combined source of information signals and synchronizing signals.

It is a still further object of the invention to provide a synchronizing receiver which ignores signals remote in time from an expected synchronizing signal.

It is still a further object of the invention to provide a synchronizing receiver which provides an accurate and unambiguous indication of the presence or absence of a synchronized condition.

It is a still further object of the invention to provide means to control a facsimile transmitter or the like in response to the state of synchronization between the transmitter and a remote receiver.

It is yet a further object of the invention to provide novel electronic circuitry for carrying out the above functions.

For illustrative purposes only, the invention will be described in connection with a typical broad band facsimile system adapted for the rapid transmission of documents and the like. A typical system may scan at the rate of 150 lines per second, allowing a total of 6.67 milliseconds for each total scan interval. For maximum utilization of the transmission channel in terms of reliability and transmission rate, a two-level transmission system may be employed wherein only two signal levels are transmitted corresponding to black and white areas respectively of the original document. The difference between the two levels will represent full modulation capacity of the transmission channel. This mode of transmission makes it difficult to provide a synchronizing signal which is readily distinguishable from noise on the one hand, and signal information on the other hand. It is obviously impossible to transmit a synchronizing signal which is larger in amplitude than the information signal or one that has complex waveforms, as is commonly done in television broadcasting. The particular solution to be described here for illustrative purposes is to use a synchronizing signal which comprises a sequence of at least six cycles of an 18.9 kilocycle square wave. It is also desirable to provide an information free period of about 300 microseconds before each transmission of the synchronizing signal to prevent information signal energy from spilling over into the synchronizing signal as a result of phased distortion in the transmission channel. However, waveforms similar to the synchronizing signal may be generated from time to time in scanning certain patterns on documents and these information signals may cause confusion or ambiguity in the detection of the synchronizing signals. This is a further problem, and one which is overcome in the present invention.

FIGURE 2 is a block diagram of a facsimile recorder and synchronizing receiver. It may be used in the system described in the preceding paragraph but is not so limited. An input line 20 is connected to a source of combined video and synchronizing signals which is not shown but which may correspond to interface 15 of FIGURE 1. Input line 20 is connected both to facsimile recorder 16 as well as to and/or gate 21. In a practical system, all the elements shown in FIGURE 2 may be installed in a common box. Gate 21 is initially in an open condition and permits signals from input 20 to pass through to sync separator 22. Further functions of gate 21 will be described later.

Sync separator 22 is designed to be selectively responsive to synchronizing signals, of whatever form they may take, and the output of sync separator 22, termed raw sync signals, is applied to a phase comparator 23 as well as to a coincidence detector 27. There is also included a controllable frequency sync generator 25 which produces sync signals of approximately the desired frequency and which can be controlled to the exact frequency desired. The output signals of this sync generator may be termed local sync signals. These local sync signals are applied to a shaping and delay circuit 26 which provides a variety of pulse outputs which are identified with separate upper case letters. Each output has the same frequency as the local sync signal applied to circuit 26 but the individual signals may be delayed by different amounts and may have different lengths, for reasons which will be apparent. In particular, a delayed output A is applied to phase comparator 23 which is thus enabled to produce an output error signal which is a measure of the phase difference between the raw sync signal from separator 22 and signal A derived from the local sync signal. The phase error signal from comparator 23 is integrated and processed in frequency control unit 24 and is applied as a frequency correction signal to sync generator 25. Elements 22–26 constitute a phase lock loop whereby the phase of elements 25 and 26 is locked to the phase of element 22. More specifically, the phase delay at output A of circuit 26 is such as to cause the phase of sync generator 25 to be slightly in advance of that of sync separator 22.

Shaping and delay circuit 26 also has an output B which is connected to coincidence detector 27. This latter unit detects coincidences between the raw sync signals from sync separator 22 and the local sync signals derived from sync generator 25. In normal operation of the receiver, synchronism between raw sync and local sync signals is achieved very soon after the receiver begins to receive signals from input line 20 and coincidence detector 27 will thereafter detect coincidences at the assumed rate of 150 per second, based on the typical transmission standards described previously. Every time a synchronizing signal from input line 20 is not received, due to a transmission channel dropout, loss of synchronism, or other cause, or is not detected because of overriding noise, a coincidence will not be detected in detector 27. The output of coincidence detector 27 is connected to an integrator 28 which integrates the coincidence signals. The integrator may have different charge and decay time constants. Reception of a pre-determined number of consecutive coincidences from detector 27 causes integrator 28 to charge up to a threshold value and transmit an insync signal to gate 21 and also to output line 29 which may be connected by an appropriate supervisory channel back to the transmitting apparatus. Failure of a predetermined number of successive coincidence signals to appear causes discharge of the integrator and loss of the insync signal. If integrator 28 is constructed along conventional lines, an occasional skipped coincidence signal will not result in loss of the insync signal and conversely an occasional coincidence signal will not cause a return of the insync signal.

Gate 21 is also connected to an output C of shaping and delay circuit 26. Gate 21 is constructed so that signals are passed from input line 20 to sync separator 22 at all times if an insync signal is *not* received from integrator 28. In the presence of an insync signal from integrator 28, gate 21 is opened only by the presence of a signal from output C of circuit 26. Output C is shaped with respect to the local sync signal from generator 25 so that it extends over at least part of the interval at which synchronizing signals are received at gate 21 when the system is in the synchronized condition. Most commonly output C will have a duration slightly longer than the synchronizing signals received at gate 21 and centered in time about these signals.

Thus, in the normal operating mode, sync separator 22 receives signals, or is enabled to act, only when a synchronizing signal is expected to appear. This prevents information signals from influencing the sync separator and also prevents receivd noise signals from affecting the sync separator, except in the narrow interval associated with the synchronizing signal. This greatly increased immunity to noise and spurious sync signals is a feature of the present invention and provides a high degree of sync stability, particularly when the transmission channel is employed at maximum transmission capacity. Failure of an occasional synchronizing signal to appear or be detected by sync separator 22 does not interfere with the operation of the facsimile receiver since frequency control 24 will maintain sync generator 25 at the previously adjusted frequency for a reasonable length of time until further raw sync signals may be received. If synchronizing signals are consistently absent for a period of time or if the sync generator should drift out of synchronism, then notification of this fact is available on output line 29 and the receiver is returned to what may be called the search mode, wherein gate 21 remains open throughout the entire scan cycle and a continuous watch is kept for incoming synchronizing pulses in an attempt to restore the system to its normal synchronized condition.

Shaping and delay circuit 26 has additional outputs D and E to supply the actual desired synchronizing signals to recorder 16.

FIGURE 3 is a schematic circuit diagram of a receiving system corresponding in all respect to the block diagram of FIGURE 2. The circuits may be more readily understood by noting that, with few exceptions, all parts of the circuit are supplied with voltages of either 0, +12, or −12 volts. Most of the transistors are driven between cutoff and saturation and, therefore the voltages at most transistor terminals may be considered as varying in a discontinuous fashion between 0, −12, or +12 volts. Cutoff currents and saturation voltages are so small as to make this a valid simplifying assumption, Understanding of the circuit may also be simplified by considering that the transistors switch between a cutoff and saturated condition when the base to emitter voltage passes through 0. The actual voltage, of course, is a few tenths of a volt. Alloy junction germanium transistors are suitable for use in the circuit and the PNP transistors may be of type 2N1305 and NPN transistors may be of type 2N1304.

In comparing FIGURE 2 with FIGURE 3, the follow-correspondences may be noted: gate 21 corresponds to transistor Q1 and associated diodes, separator 22 corresponds to Q4, Q5, Q7, Q10, Q12; comparator 23 corresponds to Q13, Q14, and Q16; frequency control 24 corresponds to Q18, Q19, Q21, Q22, Q23, and Q24; sync generator 25 corresponds to Q25, Q26; shaping and delay circuit 26 corresponds to transistors Q27 through Q35; coincidence detector 27 corresponds to Q2 and Q3; and integrator 28 corresponds to Q6, Q8, Q9, and Q11. Obviously, FIGURE 3 represents a very specific illustrative embodiment only and many parts of the circuit are individually conventional and may be replaced with various equivalent components and circuits well known to the art.

Composite video signals arriving on input line 20 are coupled to buffer amplifier Q1 which is normally biased off. The quiescent, or white input level of line 20 is 0 volts and the active or black potential is −12 volts which turns Q1 on. An input waveform containing synchronizing signals only is shown in FIGURE 4. In the initial or out-of-sync condition, the junction of SR2 and SR4 is returned to ground through a total resistance of 9.5K and SR4 is therefore back biased at all times. When Q1 is in the off condition, Q4 is biased on through R5, SR3 and R11. When Q1 is turned on, its collector potential falls to 0 and Q4 is then biased off through its connection to +12 volts by way of R13. Thus, in this mode of operation, input signals are transmitted to Q4 at all times.

Q4 and Q5 constitute a two-stage LC2 tuned amplifier which is tuned to 18.9 kilocycles, the frequency of the synchronizing signal. If other types or frequencies of synchronizing signals are employed, then Q4 and Q5 would be replaced with other tuned amplifiers or logic circuits adapted to select particular waveforms. Q7 amplifies the 18.9 kc. signals and applies them to rectifier SR6 which is followed by a two-stage RC filter-integrator including C9 and C10. The noise immunity of the system is enhanced by the fact that all transistors are biased firmly on or off and are therefore unresponsive to signal inputs below a threshold level. The collector output voltage of Q7 is shown in FIGURE 4. Ringing in the LC circuits accounts for the presence of output pulses after the input sync pulses have stopped. The filtered and integrated output of rectifier SR6 appears at C10 and is applied to the base of Q10 which is the first stage of a Schmitt trigger circuit comprising Q10 and Q12. The waveform at C10 is shown in FIGURE 4. The emitter of Q10 is returned to a point of fixed potential which is determined by the setting of potentiometer R38. When a synchronizing signal is received, each half cycle is rectified by SR6 and the output of the filter increases until the base of Q10 becomes more positive than the emitter at which point Q10 and Q12 suddenly switch from the off to the on condition. The exact time at which Q10 and Q12 switch is very critical to the entire facsimile receiving system since it controls the synchronizing accuracy. Although the filter following rectifier SR6 prevents individual pulses or groups of pulses from operating the Schmitt trigger, the firing time is nevertheless dependent and influenced by signals received throughout the scanning cycle, some of which inevitably pass through the tuned amplifier. This can cause sync jitter which is reduced but not eliminated by the phase lock loop. Potentiometer R38 can be adjusted in accordance with the minimum number of sync cycles which are desired to operate this Schmitt trigger and also operates as a delay control.

The output signal derived from the collector of Q12, shown in FIGURE 3*b*, passes through a 10 microsecond differentiator comprised of C13 and R45 and is used to trigger a one-shot multivibrator comprised of Q15 and Q17. Q15 is normally biased on and Q17 is normally biased off. The output of the multivibrator is a one millisecond positive-going pulse derived from the collector of Q17 and this pulse is also applied to the input of inverter amplifier Q20 which is also normally biased off. The Q17 collector waveform is shown in FIGURE 4. The inverter amplifier output is taken from the collector of Q20 and is a one millisecond negative going pulse. The collector outputs of Q17 and Q20 collectively comprise the raw sync signal. The inverter and one-shot multivibrator are basically conventional. Diode SR8 serves to isolate the multivibrator input from the RC differentiator once its operating cycle has started. The collector load of Q17 is jointly comprised of R58, R59 and SR9 in order to provide a sharper pulse at the collector when the transistor is switched off. When the transistor is on, collector current can pass through both R58 and R59. When Q17 is switched off, its collector current ceases but current is still supplied to the collector load for a time through C15. This current, however, back biases SR9 and can only flow through R58. The collector potential of Q17 is thus enabled to return much more rapidly to the quiescent value of minus 12 volts than would be the case if resistor R58 and diode SR9 were omitted. The emitter current of Q20 passes through diode SR10 which is supplied with a small current at all times by R65. The forward voltage drop across SR10 helps to maintain Q20 in a normal off condition even though negative voltages may be fed back to the base of Q20 via R60 and the collector of Q17, which is coupled to a negative voltage point in the phase comparator circuit.

The local sync generator 25 is a symmetrical free-running voltage controlled multivibrator including transistors Q25 and Q26. The base of each transistor is returned through an effective equivalent resistance to a negative voltage which is primarily determined by the voltage at the junction of R74 and R75 and to a lesser extent by the setting of potentiometer R77. Diodes SR13 and SR14 prevent the base of each transistor from going more negative than the associated collector and then prevent saturation of transistors Q25 and Q26. A normal half cycle of the multivibrator consists of one transistor turning on, having its collector potential fall to 0, this potential fall being coupled to the base of the other transistor which is thus turned off. The base potential at the turned off transistor falls toward the negative base return voltage with an exponential waveform determined by the time constant of the coupling capacitor C20 or C22 and the equivalent resistance of the base return circuit. When the base voltage reaches 0, the off transistor is switched on and the next half cycle of operation begins. The actual time required for the base potential of the turned-off transistor to fall from about +12 volts to 0 volts is obviously a function of the negative base return voltage and the period of the multivibrator is thus controllable by varying the return voltage. More specifically, the frequency is primarily controlled by the voltage at the junction of R74 and R75 and to a lesser extent by the setting of potentiometer R77. The local sync pulses are derived from the collector of Q26 and the collector impedance comprises two resistors and a diode for the same reason described in connection with Q17.

The raw sync pulses in the form of square waves are applied to the various delay and shaping circuits to provide the necessary waveforms for use at various points in the system. The voltage appearing at the collector Q26 is coupled to the base of Q27 which is normally biased in an off condition, but which is turned on by a negative voltage and serves as a buffer amplifier. The collector of Q27, the waveform of which is shown in FIGURE 4, is capacitively coupled to the base of Q28 which is normally biased on, and resistively coupled to the base of Q29 which is also normally biased on. When Q27 switches on, Q28 is switched off, but the base of Q28 starts an exponential fall towards −12 volts as determined by the time constant of C25, R90, and R91. When the base of Q28 reaches 0 volts, Q28 turns on again. Thus, Q28 switches back on at a time which is delayed with respect to the switching on of Q27 by a time which can be adjusted by potentiometer R91. The base of Q29 is coupled through equal 10K resistors R93 and R94 to the collectors of Q27 and Q28 respectively, and is also connected through R95 to +12 volts. Accordingly, Q29 switches off only when both Q27 and Q28 are on. The output of Q29 is taken from the collector and corresponds to the output A of FIGURE 2. The output is a negative pulse, shown in FIGURE 4, having a trailing edge essentially coincident with that of the raw sync pulse but having it leading edge delayed by an amount determined by the setting of R91. The output of Q29 is returned to a phase comparator 23, comprising Q13, Q14 and Q16 where it is compared with the raw sync pulses.

Q13 and Q14 are connected as a complementary symmetry pair between the ground and −12 volt operating voltages. Since each collector looks into the high collector impedance of the other transistor, the emitter to collector voltage gain is extremely high. Accordingly, Q13 and Q14 may be viewed as the semiconductor equivalent of a toggle switch such that Q13 or Q14 is turned off depending upon the voltage derived from the collector of Q29. The junction of the two collectors is connected to an integrating capacitor C16 and this capacitor is alternately charged towards −12 volts and towards 0 volts through either Q14 or Q13 acting as constant current generators with current feed back provided by R51 and R49. Transistors Q13 and Q14 and Q16 accordingly comprise a reversible constant current integrator operating between the limits of 0 and −12 volts. A transistor Q16 is also connected between the emitters of Q13 and Q14. It is normally biased off except when turned on by a negative going pulse applied to its base by the collector of inverter transistor Q20. In the off or non-conducting state, Q16 has no effect on the described operation of Q13 and Q14. However, when Q16 is turned on, it bypasses transistors Q13 and Q14 and draws additional current through R49 and R51 which raises the potential drop across these resistors with the net effect that Q13 and Q14 are biased off and all current flow to or from C16 ceases. The charging currents are chosen so that the time required to charge or discharge capacitor C16 is only about $\frac{1}{10}$ of a complete line scan cycle, so that in the absence of raw sync pulses, the waveform appearing at capacitor 16 is essentially trapezoidal. However, the raw sync pulse normally occurs during the positive going portion of the trapezoidal waveform and creates a porch on the waveform by halting the flow of current to capacitor C16. The resulting waveform is shown in FIGURE 4. The potential on capacitor C16 at the time of the raw sync pulse is a function of the relative phase between the raw sync pulse applied to the base of Q16 and the delayed local sync pulse derived from the collector of Q29.

The described embodiment of phase comparator 23 is particularly simple and effective. A more conventional way of generating a voltage proportional to the time delay between two pulse signals would be to use one signal to start a precision ramp generator, the output of which is sampled at a specific instant determined by a second pulse signal. With such an arrangement the sampling time must be made very short to insure an accurate reading of the ramp voltage. This usually requires additional means to generate a short sampling pulse. Furthermore, the shortness of the required sampling interval makes it difficult to accurately transfer the ramp voltage to a DC potential at some utilization point. In the described embodiment, however, one signal is used to start a ramp generator and the second signal is used to stop the ramp generator for at least a time long enough to permit the ramp voltage to be readily utilized by other circuits or to be transferred to a large capacitor.

Although only the initial positive going portion of the waveform generated at C16 is actually employed in the overall synchronizing circuit, the waveform includes a further integration to 0 volts and then back to −12 volts. These waveforms might be useful in other applications of the comparator circuit. Whether or not the linearity of other portions of the waveform is made use of, capacitor C16 is automatically reset to its −12 volt starting potential without the requirement for additional components.

Capacitor C16 is connected to the junction of the bases of Q18 and Q19 which comprise a complementary emitter follower and act as a high input impedance buffer or isolating amplifier for the voltage on C16. No steady state forward bias is required between Q18 and Q19 since crossover distortion is of no effect in this circuit. The voltage appearing at the junction of emitter resistors R62 and R63 is an essentially faithful replica of the voltage on C16. Q18 and Q19 are in turn coupled to Q21 and Q22 which act as a further complementary common emitter amplifier and also as a sampler or balanced switch. The base of Q22 is normally connected through R67 to the collector of Q17 which is normally at −12 volts and the base of Q21 is connected through R66 to the collector of Q20 which is normally at 0 volts. In this condition, diodes SR11 and SR12 are back biased and transistors Q21 and Q22 are heavily back biased and nonconducting. At the same time, no voltage is applied to the emitters of Q18 and Q19 because they are isolated from the raw sync source by back biased diodes SR11 and SR12 and because this back bias is applied in a symmetrical or push-pull fashion.

During the period of the raw sync pulse, the base of Q21 is biased through R66 to −12 volts and the base of Q22 is biased through R67 to 0 volts. In this condition, diodes SR11 and SR12 are forward biased and Q21 and Q22 are jointly forward biased by the sum of the forward drops across the two diodes. The average base potential of Q21 and Q22 is determined by the emitter potentials of Q18 and Q19 since the emitter impedance are far lower than that of bias resistors R66 and R67. Under these conditions, the voltage appearing at C16 is essentially reproduced at the junction of emitter resistors R69 and R68 of Q21 and Q22. In the absence of a raw sync pulse, however, C16 sees Q18 and Q19 as a very high impedance and the junction of R68 and R69 sees Q21 and Q22 as a very high impedance. From a different viewpoint, C16, in the absence of a raw sync pulse, is charged or discharged by Q13 and Q14 but is otherwise isolated from the circuit. During the raw sync pulse, C16 is isolated from Q13 and Q14 but connected to the junction of R68 and R69 through a high input impedance unity gain amplifier.

The voltage periodically appearing at the junction of R68 and R69 represents the output of the phase comparator part of the circuit and is used to operate the frequency control portion of the circuit which is comprised of an integrating and phase correcting circuit and a further complementary emitter follower buffer amplifier. R71 and C17 integrate and store the phase comparison signal and the other resistors and capacitors in the circuit between Q21 and Q22 and Q23 and Q24 are essentially for frequency and phase compensation to provide the desired overall band width and stability of the phase lock loop. Q23 and Q24 present a high impedance to the frequency control network and transform the frequency control signal to a low impedance to control the multivibrator, as described previously. There has thus been described a complete phase lock system whereby the multivibrator comprised of transistors Q25 and Q26 is locked in phase with the sync signals appearing on input line 20.

Means are also provided to detect the presence of this synchronism and generate a corresponding signal. The raw sync signal appearing at the collector of buffer amplifier Q27 is applied to a shaping circuit consisting of emitter transistors Q30 and Q31 which shorten the raw sync pulse without altering the position of the leading edge. A shortened pulse derived from the collector of Q31 is directed to coincidence multivibrator Q2, Q3 via resistor R3. Raw sync is also fed from the collector of Q17 to the coincidence multivibrator by way of capacitor C1. The junction of C1 and R3 is connected to −12 volts through R4. In the absence of a local sync pulse from Q31, the junction of R3 and R4 is at −12 volts. In the presence of a local sync pulse having a value of about 0 volts, the junction of R3 and R4 drops to about −1 volt in view of the relative values of R3 and R4. If a positive going raw sync pulse also appears at the same time via C1, the junction of R3 and R4 will go positive but neither a local sync nor a raw sync pulse alone will accomplish this. As soon as the junction of R3 and R4 goes positive, SR1 becomes forward biased and transmits a positive voltage to the base of Q2 which is normally biased on. This turns off Q2 and turns on Q3, generating a 1 millisecond pulse at the collector of Q3. Each such pulse signifies a detected coincidence between a raw sync and a local sync pulse.

The coincidence pulses are coupled by a diode SR5 to an integrating circuit comprising C4 and C16 and then to the base of transistor Q6 which functions as a threshold detector and buffer amplifier. The emitter of Q6 is connected to a fixed potential via R23 and R24 and conducts when the base voltage becomes more positive than the emitter voltage. Capacitor C6 is provided to deliberately decrease the switching speed of Q6 by increasing the Miller effect capacitance. The integrating circuit and the emitter biasing of Q6 are so chosen that it takes approximately 6 consecutive coincidence pulses to cause Q6 to conduct. Q6 is DC coupled to Q8 which together with Q11 forms a Schmitt trigger circuit. Q6 and Q8 together can be considered as forming one-half of a conventional Schmitt trigger. R41 and SR7 are provided in connection with Q11 for the same reasons noted in connection with Q20. Q8 is also coupled to Q9 which is not involved in any feed back loop but which switches in synchronism with Q11. The collector current of Q9 may be used directly to operate a lamp indicating the achievement of synchronism.

The potential derived from the collector of Q11 provides a signal to output line 29 and is also coupled through R8 to the junction of diodes SR2 and SR4 in the input gate circuit. In the absence of a synchronized condition, the collector of Q11 is at 0 potential and the gate operates as described previously. In the synchronized condition, however, the collector of Q11 is at −12 volts which tends to forward bias diode SR4. This tends to keep Q4 biased on at all times regardless of the state of Q1. However, the same local sync pulse that was applied to the coincidence detector is also applied to the junction of R8 and SR4 through diode SR2. During the period of the local sync pulse, diode SR2 is forward biased and the junction of R8 and SR4 is clamped to 0 volts. In this condition, signals again are passed from Q1 to Q4. If a coincidence signal fails to be generated by Q2 and Q3 over a number of cycles due to a failure of synchronism or failure of incoming synch pulses to be received, then the collector of Q11 will return to 0 volts and the gate between Q1 and Q4 will remain open.

A few additional pulse shaping circuits are illustrated in FIGURE 3. The local sync signal derived from the collector of Q31 is also passed through an additional two stages of amplification Q32 and Q33 which are comparable to Q30 and Q31 and additionally shorten the pulse without changing the position of the leading edge. The additional shortening is controlled by potentiometer R103. The signal appearing at the collector of Q33 corresponds to output D in FIGURE 2 and can be used as an unblanking signal to control the operation of the cathode ray tube or the like in the facsimile recorder.

The signal derived from collector C of buffer amplifier Q27 is also applied to a two-stage amplifier, Q34 and Q25. Each of these transistors is normally biased on and the input signal is capacitively coupled to the base of Q34 and from the collector of Q34 to the base of Q35. Thus, Q34 does not turn off immediately upon receipt of an incoming positive-going pulse at C28 and the amount of delay in switching can be controlled by potentiometer R109. When an incoming positive-going signal is received at capacitor C28, Q34 switches off and remains off for a time which can be controlled by potentiometer R109. When Q34 turns on again, Q35 is turned off for a time depending on the setting of potentiometer R112. Accordingly, the waveform which appears on the collector of Q35 is delayed from the output of the sync multivibrator by an amount which can be regulated by R109 and has a pulse width which can be regulated by R112. This signal can be used as the sweep trigger and corresponds to output E of FIGURE 2.

The figures and the description provided therewith being for illustrative purposes only, there is no intention to limit the invention except in accordance with the following claims.

What is claimed is:

1. A phase comparison circuit for measuring the phase relation between at least first and second signals comprising a ramp generator for producing a ramp signal varying between first and second voltage levels, said generator capable of starting and stopping generation of said ramp signal at varying voltages between said first and second voltage levels, the amplitude of said ramp signal relative to said first voltage level being representative of a phase angle between said first and second signals, means, coupled to said ramp generator and coupled to receive said first signal, for starting generation of said ramp signal from said first voltage level in response to said first signal, a timing generator coupled to receive said second signal for producing a timing signal of a constant duration in response to said second signal, switching means coupled to said timing generator and said ramp generator for stopping the generation of said ramp signal in response to said timing signal at least for the duration of said timing signal, a recording capacitor, and gating means coupled to said recording capacitor and said ramp and timing generators for controlling the application of the voltage at which said ramp signal is stopped by said timing signal to said capacitor, said voltage being applied to said capacitor over the duration of said timing signal wherein the voltage recorded by said capacitor represents the phase angle between said first and second signals.

2. A phase comparison circuit for measuring the phase relation between at least first and second signals comprising a ramp generator for producing a ramp signal varying between first and second voltage levels, said generator capable of starting and stopping generation of said ramp signal at varying voltages between said first and second voltage levels, the amplitude of said ramp signal relative to said first voltage level being representative of a phase angle between said first and second signals, means, coupled to said ramp generator and coupled to receive said first signal, for starting generation of said ramp signal from said first voltage level in response to said first signal, a timing generator coupled to receive said second signal for producing a timing signal of a constant duration in response to said second signal, switching means coupled to said timing generator and said ramp generator for stopping the generation of said ramp signal in response to said timing signal at least for the duration of said timing signal, a recording capacitor, gating means coupled to said recording capacitor and said ramp and timing generators for controlling the application of the voltage at which said ramp signal is stopped by said timing signal to said capacitor, said voltage being applied to said capacitor over the duration of said timing signal wherein the voltage recorded by said capacitor represents the phase angle between said first and second signals, and means to reset the amplitude of said ramp signal to said first voltage level after a voltage is recorded on said recording capacitor in response to said timing signal.

3. Apparatus according to claim 2 wherein said ramp generator comprises a first constant current source and integrating capacitor, said first constant current source charging said integrating capacitor toward said second voltage level.

4. Apparatus according to claim 2 wherein said timing generator comprises a single shot multivibrator.

5. Apparatus according to claim 4 further including an inverter amplifier coupled to said multivibrator for inverting the polarity of said timing signal.

6. Apparatus according to claim 3 wherein said means for resetting said ramp signal voltage amplitude to said first voltage level comprises a second current source coupled to said integrating capacitor providing current flow opposite to that of said first current source to charge said integrating capacitor towards said first voltage level.

7. Apparatus according to claim 5 wherein said means for controlling the application of said ramp signal voltage to said recording capacitor comprises at least two diodes coupled to said capacitor and to said ramp generator such as to pass a voltage from said ramp generator to said recording capacitor only when said diodes are forward biased by the signals produced by said single shot multivibrator and said inverter amplifier.

References Cited

UNITED STATES PATENTS

| | | | |
|---|---|---|---|
| 2,499,534 | 3/1950 | Sorber | 328—109 |
| 3,177,428 | 4/1965 | Klayman | 328—151 |
| 3,209,268 | 9/1965 | Fraunfelder | 328—110 |
| 3,119,029 | 1/1964 | Russell | 328—127 |
| 3,125,694 | 3/1964 | Palthe | 307—88.5 |
| 3,184,680 | 5/1965 | Bull | 307—88.5 |
| 3,188,491 | 6/1965 | Bahn | 307—88.5 |
| 3,191,058 | 6/1965 | Stone | 307—88.5 |
| 3,198,961 | 8/1965 | Millsap | 329—102 |
| 3,225,218 | 12/1965 | Cochran | 307—88.8 |
| 3,286,101 | 11/1966 | Simon | 307—88.5 |
| 3,305,777 | 2/1967 | Monroe | 307—88.5 |
| 3,317,756 | 5/1967 | La Porte | 307—88.5 |

ARTHUR GAUSS, *Primary Examiner.*

HAROLD A. DIXON, *Assistant Examiner.*

U.S. Cl. X.R.

328—127